United States Patent
Boel et al.

[19]

[11] Patent Number: 5,575,633
[45] Date of Patent: Nov. 19, 1996

[54] HYDRAULIC PUMPING UNIT FOR FEEDING A HYDRAULIC TILTING DEVICE

[75] Inventors: Gustav H. P. Boel, Scherpenzeel; Lambertus J. Sonneborn, Oldenzaal, both of Netherlands

[73] Assignee: Applied Power Inc., Butler, Wis.

[21] Appl. No.: 211,502

[22] PCT Filed: Aug. 10, 1993

[86] PCT No.: PCT/NL93/00168

§ 371 Date: May 24, 1994

§ 102(e) Date: May 24, 1994

[87] PCT Pub. No.: WO94/03355

PCT Pub. Date: Feb. 17, 1994

[30] Foreign Application Priority Data

Aug. 10, 1992 [NL] Netherlands ............... 9201431

[51] Int. Cl.⁶ .................................................. F04B 39/08
[52] U.S. Cl. ................................. 417/506; 251/106
[58] Field of Search ............... 417/506; 251/101, 251/102, 106

[56] References Cited

U.S. PATENT DOCUMENTS

| | | | |
|---|---|---|---|
| 2,594,141 | 4/1952 | Feighner | 251/101 |
| 2,700,984 | 2/1955 | Gleasman | 251/102 |
| 4,231,240 | 11/1980 | Fujita et al. | 70/173 |
| 5,213,308 | 5/1993 | Jeromson et al. | 251/106 |
| 5,285,997 | 2/1994 | Chang | 251/102 |

FOREIGN PATENT DOCUMENTS

| | | | |
|---|---|---|---|
| 0200870 | 11/1986 | European Pat. Off. | 86/46 |
| 0212008 | 3/1987 | European Pat. Off. | 87/10 |
| 2265632 | 10/1975 | France . | |
| 2156785 | 5/1973 | Germany | 43/7 |

*Primary Examiner*—Timothy S. Thorpe
*Assistant Examiner*—Peter G. Korytnyk
*Attorney, Agent, or Firm*—Quarles & Brady

[57] ABSTRACT

The invention relates to a hydraulic pumping unit for feeding the hydraulic tilting cylinder(s) of a vehicle having a tilting cab, having a housing (1), a displacement body mounted for movement in a pumping chamber within the housing (1), a control valve having a bore in connection with the pumping chamber and a control valve body (2) within the bore, the control valve body (2) being provided, at an end (3) projecting beyond said housing (1), with a handle by means of which the control valve body (2) may be turned between at least two positions operative to tilt the cab from the drive position and to tilt the cab back into the drive position of the vehicle respectively. In accordance with the invention, the handle has an inner part (A) that is fixedly connected with the control valve body, and an outer part (B) which encloses the inner part (A) in a free rotating manner and is mounted to be coupled with the inner part by means of a key-operated lock cylinder (24), the outer part (B) forming the handle.

3 Claims, 3 Drawing Sheets

HYDRAULIC PUMPING UNIT FOR FEEDING A HYDRAULIC TILTING DEVICE

BACKGROUND OF THE INVENTION

1. Field of the Invention

The invention relates to a hydraulic pumping unit for feeding the hydraulic tilting cylinder(s) of a vehicle having a tilting cab, in which a control valve body is provided, at an end projecting beyond the pumping unit housing, with a handle by means of which the control valve body may be turned between at least two positions operative to tilt the cab from the drive position and to tilt the cab back into the drive position of the vehicle respectively.

2. Discussion of the Prior Art

Such a pumping unit, which is designed for manual control, is disclosed in EP-A-0212008. In this well-known pumping unit, the handle is formed by a pin that is extending radially through the projecting control valve end and enables the application of a moment that is large enough to overcome the friction between the control valve body and the bore.

For such pumping units, it is of importance that they can be protected against unauthorized control to prevent, in particular, the cab from being tilted from the driving position by unauthorized persons.

Various solutions have been proposed for this purpose. It has been known, e.g., to apply a solenoid valve in a supply conduit to the hydraulic tilting cylinder, which valve is normally closed and can be opened only by energization (e.g., through a key) from the cab in order to be able to have the tilting cylinder operate by means of the pumping unit.

It is also known to apply a normally opened solenoid valve in a connecting conduit between the pressure conduit and the return conduit of a hydraulic tilting cylinder. In that case, for tilting the cab from the driving position, the valve has to be closed; this, however, can be effected only through electrical energization from the cab.

Such solutions require electrical wiring between the pumping unit and (the dash-board in) the cab, which involves an additional source of failures.

It is also known to prevent unauthorized persons from carrying out the pumping action by blocking the pumping lever or the control valve by means of a (pad) lock or by applying a lock which prevents the pump lever from being inserted in its connecting hub.

The use of separate locks, however, is awkward, whereas such additional means may easily get lost.

SUMMARY OF THE INVENTION

The present invention aims at providing a simple and handy solution, which avoids the disadvantages of the solutions proposed so far.

In accordance with the invention this aim is achieved, in that the handle comprises an inner part that is fixedly connected with the control valve body, and an outer part which is normally enclosing said inner part in a free rotating manner but is mounted to be coupled with said inner part by means of a key-operated lock cylinder, said outer part forming the proper handle.

It is to be noted that U.S. Pat. No. 4,231,240 discloses a screw cap assembly for an automotive gasoline reservoir, which compromises an inner screw-threaded plug part with a key operable cylinder lock for coupling (uncoupling) said inner part with (from) an outer handle part.

The invention will be hereinafter further explained by way of example with reference to the drawings.

DETAILED DESCRIPTION OF THE PREFERRED EMBODIMENT

Figure 1:
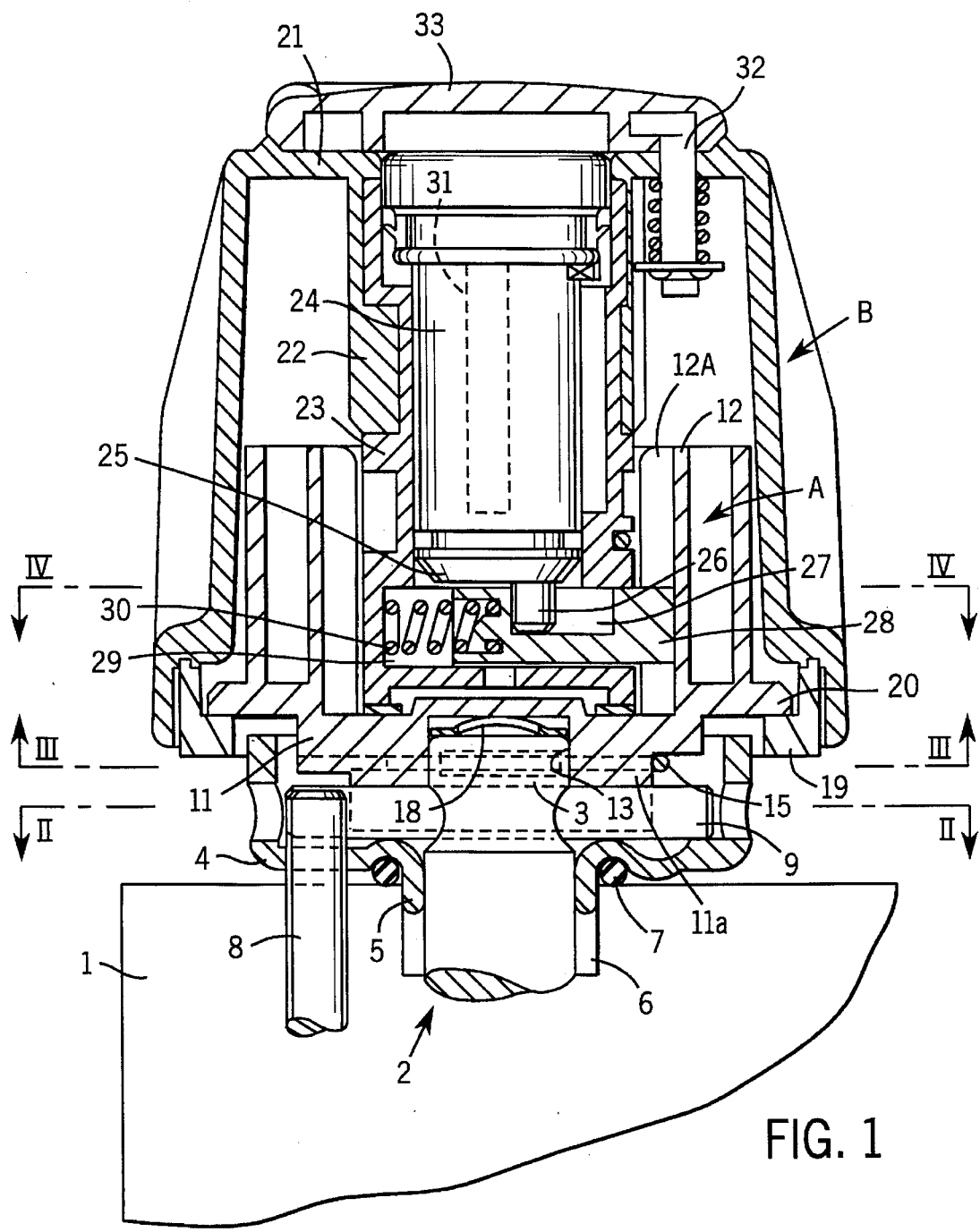
FIG. 1 shows an axial section through the control knob of the pumping unit according to the present invention.

With reference to the drawing only that part of the housing 1 of the pumping unit is shown, where the rotatably mounted control valve body 2 extends with an end portion 3 beyond the housing 1. 4 reference numerals designates a dish-shaped element, provided with a neck portion 5, that is clampingly engaged in the outer part of the bore 6. A sealing ring 7 is provided between the bottom of the element 4 and the opposite wall of the housing 1.

Figure 2:
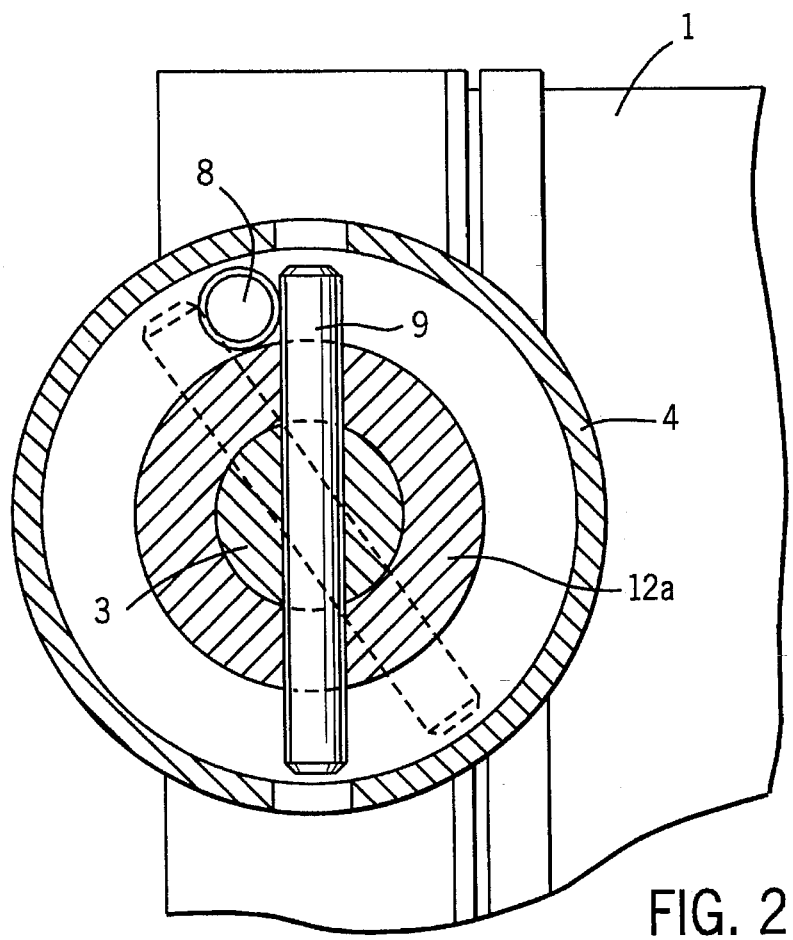
FIG. 2 is a cross-section along the line II—II of FIG. 1.

A pin 8 projecting from the housing extends through an opening in the bottom along the outer side of the dish-shaped element 4. This pin secures the element 4 against rotation and also forms an abutment for a pin 9 that radially extends through the outwardly projecting end portion 3 of the control valve body 2. This reduces the angle of rotation of the control valve body to about 150°. Each of the two stop positions (See FIG. 2) corresponds with an operative position (tilting and tilting back, respectively) of the control valve body 2. So far the pumping unit is of a well-known construction. Normally, the control valve body 2 projects through a certain distance beyond the dish-shaped element 4 and a second, longer pin is inserted through the projecting portion to function as a handle for turning the control valve body.

Instead, according to the invention, a special control knob, formed of a suitable plastics material, is used. This control valve consists of a cup-shaped inner part A that is fixedly mounted on the projecting end 3 of the control valve body 2, and an outer part B surrounding said inner part. The cup-shaped inner part has a bottom 11 and a cylindrical wall 12 projecting therefrom. The bottom 11 extends into a dish-shaped element 4 and has a central cylindrical cavity 13 for receiving the projecting end 3 of the control valve body 2 and an axially extending portion 11a of a smaller diameter, which has diametrically opposite recesses, in which the radial pin 9 fits.

Figure 3:
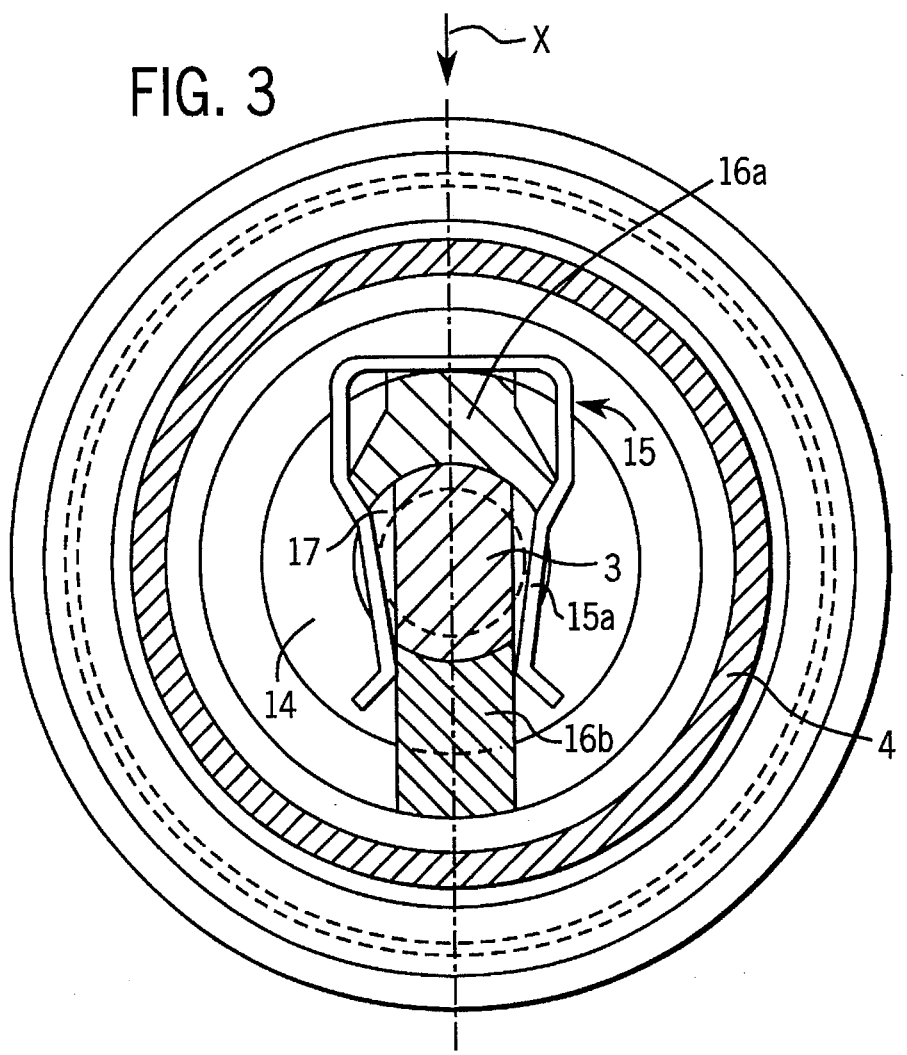
FIG. 3 is a cross-section along the line III—III of FIG. 1.
Figure 5:
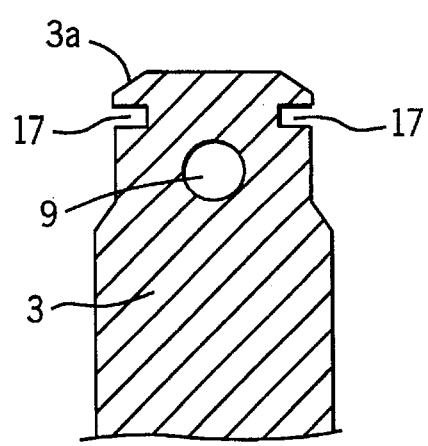
FIG. 5 shows a longitudinal section through the end portion of the control valve body that extends beyond the pump housing.

At the transition between the bottom 11 and the portion 11a of smaller diameter two opposite cuts 14 are provided in a plane at right angles to the axis of the control knob to form a seat for the legs 15a of a substantially U-shaped wire spring 15 that is adapted for radial insertion (See the arrow X in FIG. 3). The "connecting dams" 16a and 16b (FIG. 3) left adjacent the cuts 14 are formed to accurately position and hold the wire spring 15. The control knob with the thus preformed wire spring 15 is axially placed onto the projecting end 3 of the control valve body 2. For this purpose, the projecting end 3 is provided with two diametrically opposite segment-shaped cuts 17 which correspond with the spring legs 15a.

Figure 4:
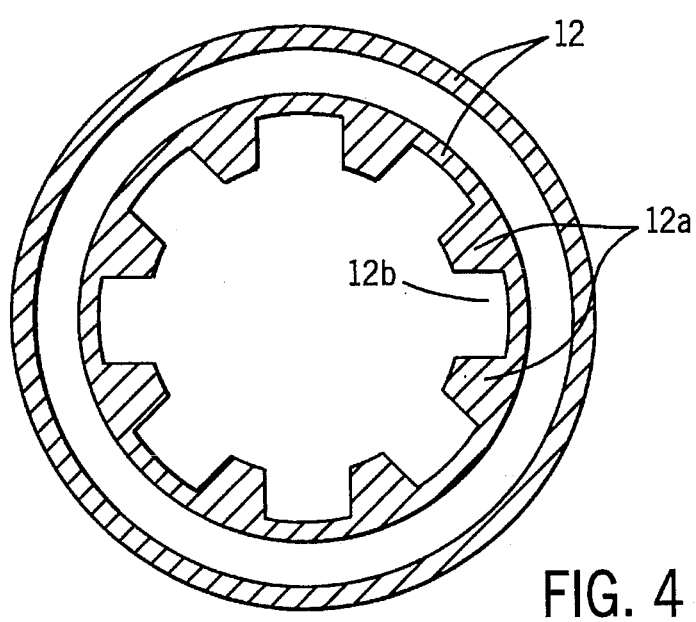
FIG. 4 is a cross-section along the line IV—IV of FIG. 1.

When placing the control knob, a bevelled edge 3a at the free end face of the end portion 3 causes the spring legs 15a to spread apart until these legs reach the plane of the cuts 17 and are permitted to "snap" into the latter. In this way, the control knob A, B is safely secured on the projecting end 3 of the control valve body 2. The access to the wire spring 15, which would have to be removed for removal of the control knob, is covered by the dish-shaped element 4, so that a removal of the knob by unauthorized persons is practically impossible. A clearance compensating spring washer 18 provided between the free end face of the projecting portion 3 of the control valve body and the bottom of the cylindrical cavity 13 secures a rattling-free seat of the knob on the projecting end 3 of the control valve body. The upstanding wall 12 of the knob part A has on its inner side a ring of axially extending ribs 12a which confine insert slots 12b for a lock bolt to be described hereinafter (See FIG. 4).

The cap-shaped outer part B surrounding the inner part A has a locking ring 19 which—upon assembly—is fixed, as by heat sealing, into the lower end of said outer portion and engages under a radially extending rim 20 of the part A so as to secure said outer part axially relative to the inner part A.

The outwardly ribbed cap-shaped outer part B has a central portion 22 extending from the upper cap end 21 downwardly and comprising a container 23, in which a lock cylinder 24 of a well-known type is accommodated. The key inserting slot is indicated at 31. Upon removal of the key, the lock cylinder is covered to the exterior by a cover 33 that is pivoted about an axis 32 and may be opened against spring action.

The lock cylinder part 25 which may be turned through an angle of, e.g., 180°, carries an eccentrically positioned pin 26 which engages a recess 27 of a bolt 28 which is mounted for movement in a radial direction in a chamber 29 in the lower part of the container 23. A spring 30 tends to move the bolt 28 into its outer position, in which it engages the slot 12b between two adjacent ribs 12a of the upstanding wall 12 of the cup-shaped inner part A. In the drawing (FIG. 1), the bolt 28 is in this outer position, which means that the two knob parts A and B are coupled with one another. The knob has arrived in this position (which permits the control valve body to be operated) by inserting a key (e.g., the ignition key of the vehicle) in an initial position, in which the bolt is in its retracted position and in which the lock cylinder is locked relative to the fixedly mounted lock cylinder housing, and then turning the unlocked lock cylinder through 180° towards the operative position shown in the drawing. Thereupon, the key is removed from the lock again.

It is also possible, however, to apply a lock cylinder of the type, with which the key is permitted to be pulled out again only after the lock cylinder has been returned back from the operative position shown in the drawing into the initial position (with the lock cylinder locked and the operating knob uncoupled).

We claim:

1. A hydraulic pumping unit comprising a pumping unit housing, a control valve body within said housing and having an end projecting beyond said housing with a handle at said end by means of which the control valve body is turned between at least two positions relative to said housing, characterized in that the handle comprises an inner part that is fixedly connected with the control valve body, and an outer part enclosing said inner part in a free rotating manner, said outer part being coupled with said inner part by means of a key-operated lock cylinder, said outer part forming the handle.

2. A hydraulic pumping unit according to claim 1, characterized in that the inner part of the handle is cup-shaped and is provided at its inner circumferential wall with axially and radially extending ribs with slots therebetween, whereas the outer part is cap-shaped and provided with a central portion that extends from the upper cap wall inwardly, into the cup-shaped inner part, said central portion containing a key-operated cylinder lock, the rotary part of which actuates a bolt which is radially movable between an operative position in which it engages one of the slots of the inner part and an inoperative position out of engagement with the inner part.

3. A hydraulic pumping unit according to claim 1, characterized in that the outer part is formed of plastics material and is provided at one end with an inwardly extending locking flange, which is attached to said part by heat sealing and engages under an outwardly extending rim portion of the cup-shaped inner part.

\* \* \* \* \*